Jan. 22, 1952     E. B. GRAVES     2,583,213
X-RAY TUBE CONTROL
Filed March 26, 1948
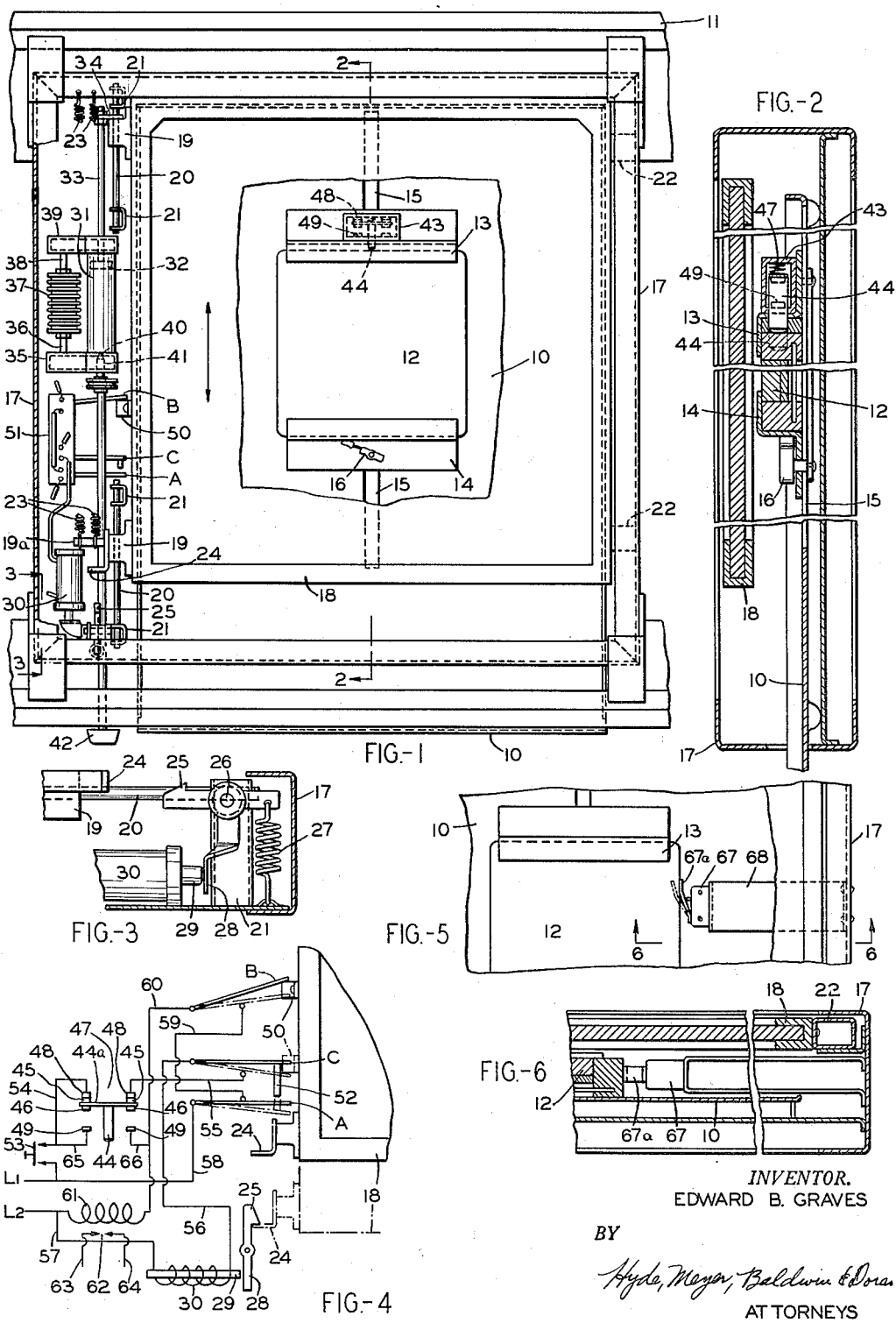
INVENTOR.
EDWARD B. GRAVES
BY
Hyde, Meyer, Baldwin & Doran
ATTORNEYS Patented Jan. 22, 1952

2,583,213

UNITED STATES PATENT OFFICE 2,583,213

X-RAY TUBE CONTROL

Edward B. Graves, South Euclid, Ohio, assignor to Picker X-Ray Corporation Waite Manufacturing Division, Inc., Cleveland, Ohio, a corporation of Ohio Application March 26, 1948, Serial No. 17,211

4 Claims. (Cl. 250—62)

This invention relates to improvements in X-ray tube control and more particularly to improved means for preventing spoiled radiographs when using Bucky grid technique.

An object of the present invention is to provide means to compel the presetting or preparation of a Bucky grid for an excursion before making a radiographic exposure.

Another object of the present invention is to so coordinate a cassette or film holder together with a Bucky grid control means that the cassette must be in its proper place and the Bucky grid must be ready and prepared for an excursion before an X-ray exposure can be initiated.

Other objects and advantages of the present invention will be apparent from the accompanying drawings and description and the essential features thereof will be set forth in the appended claims.

In the drawings, Fig. 1 is a top plan view of one form of my device with a portion of the grid broken away to more clearly show the construction;

Fig. 2 is an enlarged transverse sectional view of the same taken along the line 2—2 of Fig. 1;

Fig. 3 is an enlarged fragmental sectional view taken from approximately the position of the line 3—3 of Fig. 1;

Fig. 4 is a diagrammatic view illustrating the wiring and operation of the form of the device shown in Figs. 1, 2 and 3;

Fig. 5 is a fragmental sectional view of a portion of Fig. 1 showing a modified form of my device;

While Fig. 6 is an enlarged fragmental sectional view taken along the lines 6—6 of Fig. 5.

In making a radiograph utilizing a Bucky grid, quite often the operator will forget to latch up the moving grid, when it is spring driven, or otherwise forget to prepare the Bucky grid for an excursion before initiating an exposure. In such a case, if he tries to make an exposure, he gets a picture of a lot of lead strips instead of a proper radiograph. The present invention compels the proper presetting of the grid for an excursion and the placing of a cassette in the tray ready for a radiograph and both of these are so coordinated that they must be in proper condition before the initiation of an exposure.

In Figs. 1, 2 and 3, I have shown one form of my invention wherein a tray 10 is positioned beneath an examination table or the like 11 in the usual manner. In the central portion of this tray is mounted a cassette or film holder 12 which is held in position by clamping jaws 13 and 14 slidably mounted in slots 15 of the tray and held in clamping position by a locking lever 16 in a well-known manner. A frame 17 supported by the table 11 carries a Bucky grid 18 mounted for sliding movement in the direction of the arrow of Fig. 1. On the left side of the grid frame as seen in Fig. 1 are mounted brackets 19 which slidably embrace rods 20 which in turn are fixed in position by brackets 21 secured to frame 17. The right-hand side of the Bucky grid is provided with ears 22 which slide in a portion of frame 17. In the present form of my invention, means for causing an excursion of the Bucky grid is provided in springs 23 which are connected between frame 17 and a projection 19a on one of the brackets 19. In preparing the grid for an excursion, it is pulled toward the observer, as viewed in Fig. 1, so that a projection 24 engages behind latch 25. This latch, as clearly shown in Fig. 3, is pivotally mounted on the frame at 26 and is biased toward latching position by means of a spring 27. An arm 28 of the latch lies opposite a plunger 29 operated by a solenoid 30 in a manner presently to be described.

The movement of the Bucky grid is controlled by means of a dashpot device comprising a cylinder 31 mounted in fixed position on frame 17 and having a reciprocable piston 32 connected by piston rod 33 with a bracket 34 mounted on one of the brackets 19 connected with the Bucky grid. Communication between opposite ends of cylinder 31 is provided by means of housing 35, conduit 36, Sylphon bellows 37, conduit 38 and housing 39. This dashpot device is filled with liquid in the usual manner and the flow of this liquid is controlled through an opening 40 by means of a needle valve 41 which is controlled by knob 42.

It results from this construction that when the Bucky grid 18 is moved by hand so as to place the projection 24 behind the latch 25, thereafter operation of the solenoid 30 will cause the plunger 29 to strike the arm 28, as shown in Fig. 3, so as to move the nose of latch 25 in counterclockwise direction about the pivot 26 thus releasing the Bucky grid to the control of the springs 23. These springs then cause the grid to make an excursion, the speed of which is controlled by the dashpot device including the cylinder 31 and the piston 32.

Mounted on the jaw 13 of the clamp for the cassette 12 is a housing 43 in which is mounted a movable switch member 44. This switch member has an electrically conductive arm 44a on which are mounted two pairs of contacts 45 and 46. A spring 47 normally urges the switch member to the dot-dash position indicated in Fig. 2. When a cassette 12 is in proper position in the tray, it moves the plunger 44 to the full line position of Fig. 2. When the switch member 44 is in this full line position the contacts 46 are in engagement with the contacts 45 as shown in Fig. 4. When the switch member 44 is in the dot-dash position of Fig. 2 then the spring 47 urges the contacts 46 into engagement with the contacts 49.

Referring now to Figs. 1 and 4, switches A, C and B are shown mounted toward the left-hand side of Fig. 1 and controllable by a projection 50 mounted on the Bucky grid. The contacts of these switches are all inside the housing 51 mounted on the frame 17. When the Bucky is in latched position as shown in dot-dash lines in Fig. 4, the projection 50 has carried switch C to closed position and has caused the nose 52 of the switch blade to engage switch A so as to open it. At this time switch B, which is normally closed, is in its closed position as shown in dot-dash lines in Fig. 4. A source of electric current is indicated at $L_1$, $L_2$. To initiate an exposure, the operator now closes the button 53 which completes a circuit through line 54, contacts 48 and 45, line 55, switch C, line 56, solenoid 30 and line 57. Solenoid 30, when energized, causes plunger 29 to engage arm 28 so as to release latch 25 from the projection 24 of the Bucky grid. The springs 23 then cause an excursion of the grid to start, controlled by the dash-pot device previously described. Immediately after the grid starts its excursion, the projection 50 causes the nose 52 to release switch blade A which is only slightly open and allows this switch to close to its full line position as shown in Fig. 4. This completes a circuit from $L_1$ through line 58, switch A, line 59, switch B (which at this time is in its dot-dash position) and line 60 through coil 61. This closes normally open contacts 62 which lead through lines 63 and 64 to an X-ray transformer to initiate an X-ray exposure in the usual manner. At the end of an exposure, the grid projection 50 engages switch B so as to open the same moving it to the full line position of Fig. 4. This stops the X-ray exposure. Shortly after the switch A was opened during the excursion of the grid, the switch C was opened which deenergized the solenoid 30. This solenoid-energizing circuit stays open until the grid is again relatched or recocked ready for the next operation.

It must be obvious from the above description that if there were no cassette or film holder 12 properly positioned in the tray 10 then the switch member 44 instead of being in the position shown in Fig. 4 would be in the dot-dash position of Fig. 2. This would open the contacts 48 and the X-ray initiating circuit above described would be disabled.

Conversely, if a cassette were positioned in the tray ready for the making of a radiograph, unless the grid 18 were cocked and latched as shown in dot-dash lines in Fig. 4, no exposure could be initiated because the switches A, B and C would be in the full line position of Fig. 4 thus disabling the X-ray exposure initiating circuits.

It should be noted that, in the absence of a cassette properly positioned, the switch member 44 is in a position to cause contacts 46 and 49 to engage as indicated in Fig. 4. Thus upon depression of the button 53, the X-ray tube could be energized through line 65, contacts 46 and 49, lines 66 and 60 and coil 61.

Another form of my invention is indicated in Figs. 5 and 6. It should be understood that all parts previously described form a portion of this modification except those changes which are here described. Here a switch 67 is so positioned adjacent the cassette 12 that the switch blade 67a will normally be in switch-open condition as indicated in dot-dash lines in Fig. 5 unless a cassette or film holder is placed in the tray 10. This closes the switch 67 in the same manner that contacts 48 are closed with contacts 45 in the diagram of Fig. 4. In other words, the switch 67 may be substituted for the coacting contacts 45 and 48 in the diagram of Fig. 4. Here again it is necessary when the cassette is properly placed in position for a radiograph to first cock and latch the Bucky grid before an X-ray exposure may be initiated.

What is claimed is:

1. In combination, means for energizing an X-ray tube, means for exposing a radiographic film to the rays from said tube including a film holder and a Bucky grid, means requiring presetting for causing an excursion of said grid, releasable holding means for maintaining said third named means in preset condition prior to an excursion of said grid, release means for said holding means, a switch closed by presetting of said third named means, and an electrical circuit including, in series, said switch and said release means and means responsive to a film holder positioned to receive rays from said tube.

2. In combination, means for energizing an X-ray tube, means for exposing a radiographic film to the rays from said tube including a film holder and a Bucky grid, a spring requiring cocking for causing an excursion of said grid, a switch closed by cocking of said spring, a switch closed by a film holder in position to receive rays from said tube, and means controlling said first named means including both of said switches in series.

3. In combination, a Bucky grid, a first switch closed thereby, a film holder, two switches controlled by said holder including a second switch closable responsive to said holder loaded and a third switch closable responsive to said holder empty, and alternative means for energizing an X-ray tube including on the one hand said first and second switches in series and on the other hand said third switch only.

4. In combination, a cassette, a grid positioned over said cassette for movement relative thereto, spring means for causing an excursion of said grid, a latch for holding said spring means cocked, electrically operated release means for said latch, a switch A openable by cocking movement of said grid and closable by starting excursion movement of said grid, a switch B closable by cocking movement of said grid and openable by finish excursion movement of said grid, a switch C closable by cocking movement of said grid and openable by intermediate excursion movement of said grid, a switch responsive to positioning of said cassette beneath said grid, electrically operated X-ray exposure initiating means, an electrical circuit including in series an operator-operable member and said cassette responsive switch and said switch C and said release means, and an electrical circuit including in series said switches A and B and said X-ray exposure initiating means.

EDWARD B. GRAVES.

REFERENCES CITED

The following references are of record in the file of this patent:

UNITED STATES PATENTS

| Number | Name | Date |
|---|---|---|
| 1,592,279 | Lechenger | July 13, 1926 |
| 1,979,457 | Drum et al. | Nov. 6, 1934 |
| 2,145,868 | Fischer | Feb. 7, 1939 |
| 2,241,516 | Ledin | May 13, 1941 |
| 2,466,355 | Baker | Apr. 5, 1949 |